United States Patent
Robb et al.

(10) Patent No.: US 9,343,760 B2
(45) Date of Patent: May 17, 2016

(54) PROCEDURE FOR STACK VOLTAGE RECOVERY

(71) Applicant: GM GLOBAL TECHNOLOGY OPERATIONS LLC, Detroit, MI (US)

(72) Inventors: Gary M. Robb, Honeoye Falls, NY (US); Daniel T. Folmsbee, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 436 days.

(21) Appl. No.: 13/679,821

(22) Filed: Nov. 16, 2012

(65) Prior Publication Data
US 2014/0141348 A1 May 22, 2014

(51) Int. Cl.
*H01M 8/04* (2006.01)

(52) U.S. Cl.
CPC ...... *H01M 8/04291* (2013.01); *H01M 8/04067* (2013.01); *H01M 8/0488* (2013.01); *H01M 8/04089* (2013.01); *H01M 8/04231* (2013.01); *H01M 8/04701* (2013.01); *H01M 2250/20* (2013.01); *Y02E 60/50* (2013.01)

(58) Field of Classification Search
CPC .............. H01M 8/04; H01M 8/04291; H01M 8/04067; H01M 8/04089
USPC .................................................. 429/408-451
See application file for complete search history.

(56) References Cited

U.S. PATENT DOCUMENTS

| 2011/0091781 | A1 | 4/2011 | Folmsbee |
| 2011/0129751 | A1* | 6/2011 | Nagahara ...................... 429/432 |
| 2011/0143243 | A1* | 6/2011 | Arthur et al. .................. 429/429 |
| 2011/0195324 | A1* | 8/2011 | Zhang et al. .................. 429/413 |

* cited by examiner

*Primary Examiner* — James Lee
(74) *Attorney, Agent, or Firm* — John A. Miller; Miller IP Group, PLC

(57) ABSTRACT

A system and method for reconditioning a fuel cell stack to recover stack voltage loss. The method includes first operating the fuel cell stack in a wet condition where the humidity level in the stack is above 100% to provide liquid water at the cell electrodes. The method then applies a low voltage potential to the stack that causes contaminants to be released from the catalyst surface of the cell electrodes. This step can include starving the cathode side of oxygen for a limited period of time. The method then causes water to flow through the stack so that the contaminants are flushed out of the stack. The process can be performed during vehicle operation where small amounts of voltage would be recovered or during vehicle service where a relatively large amount of voltage could be recovered.

17 Claims, 1 Drawing Sheet

PROCEDURE FOR STACK VOLTAGE RECOVERY

BACKGROUND OF THE INVENTION

1. Field of the Invention

This invention relates generally to a system and method for recovering fuel cell stack voltage loss and, more particularly, to a system and method for recovering fuel cell stack voltage loss that includes providing liquid water at the stack electrode surface, operating the stack at a low cell potential and flowing water through the fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

Wet stack operation, that is, operation with a high amount of humidification, is desirable for system humidification, performance and contaminant removal. However, there are various reasons to operate a fuel cell stack with a lower amount of humidification, also known as a dry operating condition. For example, wet stack operation can lead to fuel cell stability problems due to water build up, and could also cause anode starvation resulting in carbon corrosion. In addition, wet stack operation can be problematic in freeze conditions due to liquid water freezing at various locations in the fuel cell stack. Therefore, there is a need in the art for systems that have been optimized for non-wet operating conditions.

In a fuel cell system, there are a number of mechanisms that cause permanent loss of stack performance, such as loss of catalyst activity, catalyst support corrosion and pinhole formation in the cell membranes. However, there are other mechanisms that can cause stack voltage losses that are substantially reversible, such as the cell membranes drying out, catalyst oxide formation, and a build-up of contaminants on both the anode and cathode side of the stack. Therefore, there is a need in the art to remove the oxide formations and the build-up of contaminants, as well as to rehydrate the cell membranes, to recover losses in cell voltage in a fuel cell stack.

In order for a PEM fuel cell system to be commercially viable, there generally needs to be a limitation of the noble metal loading, i.e., platinum or platinum alloy catalyst, on the fuel cell electrodes to reduce the overall system cost. As a result, the total available electro-chemically active surface area of the catalyst may be limited or reduced, which renders the electrodes more susceptible to contamination. The source of the contamination can be from the anode and cathode reactant gas feed streams including humidification water, or generated within the fuel cells due to the degradation and decomposition of the membrane, stack sealants and/or bipolar plates. One particular type of contaminate includes anions, which are negatively charged, such as chlorine or sulfates, such as $SO_4$. The anions tend to adsorb onto the platinum catalyst surface of the electrode during normal fuel cell operation when the cathode potential is typically over 650 mV, thus blocking the active site for oxygen reduction reaction, which leads to cell voltage loss. Moreover, if proton conductivity is also highly dependent on a contaminate free platinum surface, such as nano-structured thin film (NSTF) type electrodes, additional losses are caused by the reduced proton conductivity.

U.S. patent application Ser. No. 12/580,912, filed Oct. 16, 2009, titled Automated Procedure For Executing In-Situ Fuel Cell Stack Reconditioning, assigned to the assignee of this application and herein incorporated by reference, discloses a system and method for reconditioning a fuel cell stack that includes increasing the humidification level of the cathode side of the stack to hydrate the cell membranes and providing hydrogen to the anode side of the fuel cell stack at system shut-down, where the system monitors reconditioning event triggers, reconditioning thresholds and reconditioning system checks so that the reconditioning process can be provided during vehicle operation.

Generally, stack reconditioning includes running the fuel cell stack with high relative humidity to remove contaminates from the stack to recover from stack degradation. However, reconditioning is an abnormal operation and exposes the stack to wet operations that may cause reliability issues if liquid water ends up in anode flow-fields and low anode flow rates are not able to purge them out. Thus, reconditioning should be performed only when it is absolutely necessary. Previous stack reconditioning triggers included triggering the reconditioning by monitoring the number of vehicle trips or key cycles. If the number of trips exceeded a threshold, which is considered as a representation of time after which stack voltage has degraded, the reconditioning process is triggered. However, improvements in triggering the reconditioning process can be made so that the reconditioning is only performed when necessary to reduce the abnormal operation conditions.

It is also known in the art that some of the contaminants that form on the electrodes in a fuel cell stack can be removed from the electrode by oxidizing the contaminant. In order to oxidize the contaminants on the electrodes, it is necessary to raise the potential across the electrodes to a high enough voltage to provide that oxidation. However, the theoretical maximum potential of a hydrogen fuel cell stack within a typical fuel cell system on a vehicle is lower than the necessary voltage potential.

SUMMARY OF THE INVENTION

In accordance with the teachings of the present invention, a system and method are disclosed for reconditioning a fuel cell stack to recover stack voltage loss. The method includes first operating the fuel cell stack in a wet condition where the humidity level in the stack is above 100% to provide liquid water at the cell electrodes. The method then applies a low voltage potential to the stack that causes contaminants to be released from the catalyst surface of the cell electrodes. This step can include starving the cathode side of oxygen for a limited period of time. The method then causes water to flow through the stack so that the contaminants are flushed out of the stack. The process can be performed during vehicle operation where small amounts of voltage would be recovered or during vehicle service where a relatively large amount of voltage could be recovered.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for recovering a reversible stack voltage loss is merely exemplary in nature, and is in no way intended to limit the invention or its applications or uses.

Figure 1:
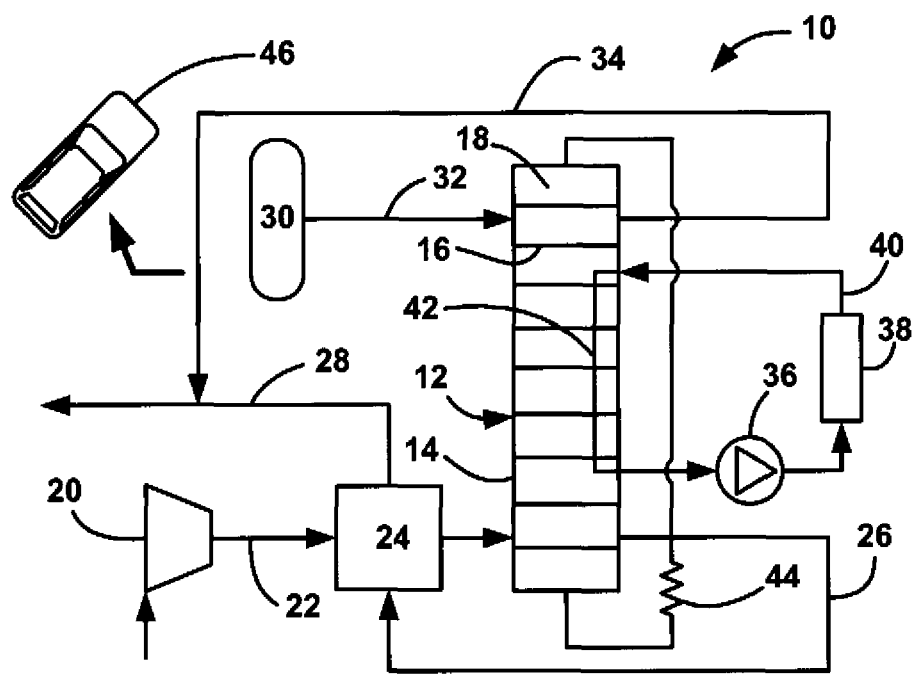
FIG. 1 is a simple illustration of a fuel cell system.

FIG. 1 is a simple block diagram of a fuel cell system 10 including a fuel cell stack 12 having a plurality of stacked fuel cells 14. The fuel cell system 10 would typically be provided on a vehicle 46 for the purposes of the invention as discussed below. As discussed above, the fuel cells in a typical fuel cell stack of this type will include MEAs having the cell electrodes with the reactant catalyst and separated by bipolar plates having reactant flow channels and cooling fluid flow channels all in well known designs. Line 16 represents the bipolar plates having the flow channels extending therethrough, where cell MEAs 18 would be between the bipolar plates 16.

A compressor 20 provides airflow to the cathode side of the fuel cell stack 12 on cathode input line 22 through a water vapor transfer (WVT) unit 24 that humidifies the cathode input air. The WVT unit 24 is employed in this embodiment as a non-limiting example, where other types of humidification devices may be applicable for humidifying the cathode inlet air, such as enthalpy wheels, evaporators, etc. In some fuel cell system designs, a by-pass line (not shown) may be provided around the WVT unit 24 to selectively control the humidity level provided to the cathode input reactant gas. A cathode exhaust gas is output from the stack 12 on a cathode exhaust gas line 26. The exhaust gas line 26 directs the cathode exhaust gas to the WVT unit 24 to provide the humidity to humidify the cathode input air, where an output from the WVT unit 24 is provided on a system exhaust line 28 in this non-limiting system configuration.

The fuel cell stack 12 also receives hydrogen from a hydrogen gas source 30 on an anode input line 32 and provides an anode exhaust gas on line 34 that is sent to the system exhaust line 28. In an alternate design, the anode exhaust gas can be sent back to the anode input in a recycle anode loop design, where a bleed valve would be provided to periodically bleed nitrogen from the anode side of the stack 12 in a well know process. A pump 36 pumps a cooling fluid through the fuel cell stack 12 and a cooling fluid line 40 outside of the stack 12 and through a radiator 38. Line 42 within the fuel cell stack 12 is intended to represent the many flow channels provided in the stack 12, typically within the bipolar plates 16 in various designs, also well understood by those skilled in the art. A stack load 44 is shown electrically coupled to the fuel cell stack 12 and is intended to represent any electrical load on the fuel cell stack 12 consistent with the discussion herein.

Controlling the operation of the fuel cell stack 12 so that liquid water is present at the fuel cell electrode surface is desirable for reducing electrode contamination and thus recoverable voltage loss. In other words, it is desirable to operate the fuel cell stack 12 so that the humidity level is above 100%, where liquid water would be present at the electrodes. It is believed that operating the fuel cells with wet membranes reduces the stress on the membranes, which reduces the contaminants being released therefrom. This is typically accomplished by reducing the operating temperatures of the stack cooling fluid. It may be possible to control the WVT unit 24 to provide a maximum amount of humidity to the cathode inlet air. However, it is not always possible to operate the stack 12 at this humidity level. For example, during summer operation, higher ambient temperatures can make wet operation of the stack 12 more difficult. Additionally, during winter operation, vehicle cabin heating requirements can limit the minimum stack cooling fluid temperature.

Also, it may not be desirable to operate the stack 12 at a high level of humidity because the efficiency of operation of the stack 12 may be reduced.

If it is determined that the actual stack voltage loss is greater than a predetermined unrecoverable voltage loss that occurs from stack operation, it is assumed that the voltage loss is the result of electrode contamination, which if removed, will or may allow the voltage loss to be recovered. Also, a stack voltage recovery process can be performed based on the amount of time that has gone by instead of an actual measurement of the stack voltage, for example, each series of recovery events as discussed below is performed every month, where that time may be reduced as the stack 12 ages.

The present invention proposes two techniques for recovering the voltage loss that results from electrode contamination. The first technique is performed during normal operation of the fuel cell stack 12 and attempts to recover the voltage loss in small increments or amounts. The second technique is performed during service of the vehicle 46, where normal operation of the fuel cell stack 12 is not occurring, which allows significant amounts of voltage loss to be recovered at each recovery process.

Figure 2:
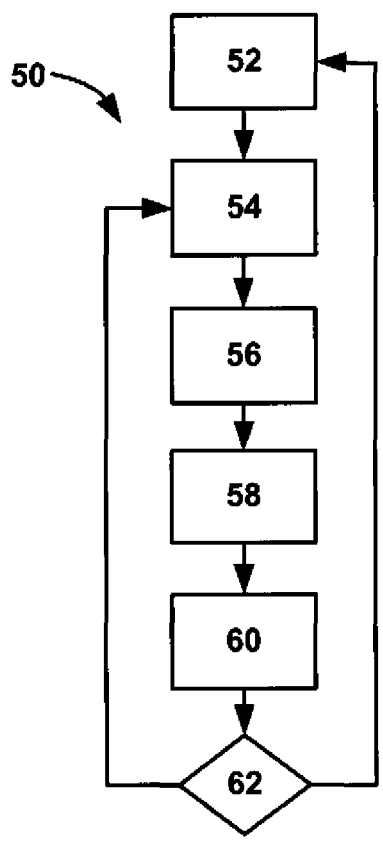
FIG. 2 is a flow chart diagram showing one process for recovering reversible stack voltage loss in a fuel cell stack.

FIG. 2 is a flow chart diagram 50 showing a process for removing contaminants from the fuel cell stack 12 to recover stack voltage loss while the vehicle 46 is being operated or under normal vehicle operation. If the stack voltage falls to the predetermined value or the requisite time has elapsed for performing the voltage recovery operation, the voltage recovery process is initiated at box 52. When the voltage recovery process is initiated at the box 52, the control algorithm then moves to box 54 to cause the stack 12 to be operated in a wet condition, i.e., to have a higher humidity level than would otherwise normally be provided at the current stack operating condition. During the wet operating condition, the humidity level within the stack is typically greater than 100% so that liquid water is present at the cell electrodes. Any process for causing the stack 12 to operate in a wet operating condition can be employed, including increasing the humidity transfer of the WVT unit 24 to the cathode inlet airflow or reducing the temperature of the fuel cell stack 12 through the speed of the pump 36 or the cooling capacity of the radiator 38. Operating the stack 12 in the wet condition typically only needs to be done for a few seconds before the stack 12 is ready for the next voltage recovery step.

The next step at box 56 is to apply a low voltage potential to the stack 12 to release contaminants from the catalyst surface of the cell electrodes and to make the contaminants more soluble in liquid water. This step can be performed at any suitable time, such as when the vehicle is in an idle mode. For example, when the fuel cell system is in an idle mode, such as when the fuel cell vehicle 46 is stopped at a stop light, where the fuel cell stack 12 is not generating power to operate system devices, air and hydrogen are generally still being provided to the fuel cell stack, and the stack 12 can generate output power. If the control algorithm is configured to only perform the voltage recovery loss when the vehicle is in the idle mode, then once the stack recovery trigger is initiated at the box 52, the algorithm may wait until the next idle mode to perform the stack low voltage operation at the box 54.

One technique for providing the low voltage is to starve the cathode side of the stack 12 of oxygen. The ratio of the amount of oxygen to the current generated by the stack 12 is known as cathode stoichiometry. During normal fuel cell stack operation, the compressor 20 typically provides enough air to include about twice the amount of oxygen necessary for a particular desired stack current density, which is a cathode stoichiometry of 2. During the voltage recovery process, a fixed amount of air from the compressor 20 flows through the cathode and the load 44, such as a vehicle battery, is used to draw the corresponding amount of current from the stack 12 for that cathode oxygen level, which is a cathode stoichiometry of 1, resulting in the cathode being starved of oxygen. As the cathode is starved of oxygen, the fuel cell reaction cannot be supported and the stack voltage begins to collapse. This low voltage condition can be sustained stably for a short period of time. In one non-limiting embodiment, the low voltage condition is performed for about 10 seconds. The low voltage operating condition operates to release the contaminants from the electrode surface into the water that is currently present at the stack electrodes.

The next step at box 58 is to cause water to flow through the stack 12 so that the liquid water that was present at the electrode and has absorbed the contaminants is flushed out of the stack 12 before the water evaporates and the contaminants are redeposited back on the stack electrodes. This step is performed by maintaining the wet operation of the fuel cell stack 12 after the low voltage is applied to the stack 12. Particularly, by monitoring the stack current density after the low voltage step, the determination of whether the stack 12 is operated at a wet enough condition for a long enough period of time can be made.

Providing hydrogen to the fuel cell stack 12 when it is in the idle mode is generally wasteful because operating the stack 12 under this condition is not producing very much useful work, if any. For these and other fuel cell system operating conditions, it may be desirable to put the system 10 in a stand-by mode where the system 10 is consuming little or no power, the quantity of hydrogen fuel being used is minimal and the system can quickly recover from the stand-by mode so as to increase system efficiency and reduce system degradation. Operations for putting the stack 12 in a stand-by mode are known in the art. If the vehicle 46 is in the stand-by mode and the low voltage step has ended, the algorithm waits until the stand-by mode has ended before beginning the water flush step. The water flush step is performed for a couple of minutes after which the recovery process is completed.

Since this process for voltage recovery while the vehicle 46 is being operated only recovers a small amount of voltage, such as 5 mV, the algorithm may perform a series of voltage recovery steps, for example, five, to recover the entire amount of recoverable stack voltage that is possible. As such, the algorithm increments a counter at box 60, and then determines whether the count has reached the desired number of recovery operations at decision diamond 62. If the algorithm determines that the counter has not reached the desired number at the decision diamond 62, the algorithm returns to the box 54 to implement the vehicle wet operation again. If the counter has reached the desired number at the decision diamond 62, then the algorithm moves to the box 52 to wait for the next time that the stack voltage recovery sequence is initiated.

In another embodiment, the low voltage step at the box 56 is performed when the vehicle 46 is being shut-down. After the low voltage step, the algorithm waits for the vehicle 46 to be turned back on to perform the flush step at the box 58. If that time period is to long where the cell membranes have dried out and the contaminants are deposited back on the electrodes, then the algorithm disregards the recovery event as being one of the events that is part of the series. Thus, both a stand-by mode recovery event and a vehicle shut-down recovery event can be part of the same series of events.

There may be certain extended times where operation of the vehicle will not allow a situation where the stack 12 can be run wet enough to perform the voltage recovery process discussed above. For example, in cold climate operating environments where cabin heating is necessary, it may not be possible to run the stack 12 at a low enough temperature to provide the wet stack condition and still be able to provide the required heat necessary to heat the cabin of the vehicle 46. Thus, for an entire winter season it may not be possible to perform the voltage recovery during stack operation. Also, in high temperature environments, it may not be possible to reduce the temperature of the stack 12 so that the humidity level is above 100%. Further, there may be various diagnostics being performed on the vehicle that prevent the voltage recovery process. Under these conditions, the vehicle 46 can be taken to a service center to perform the voltage recovery process where the vehicle is not driven.

Figure 3:
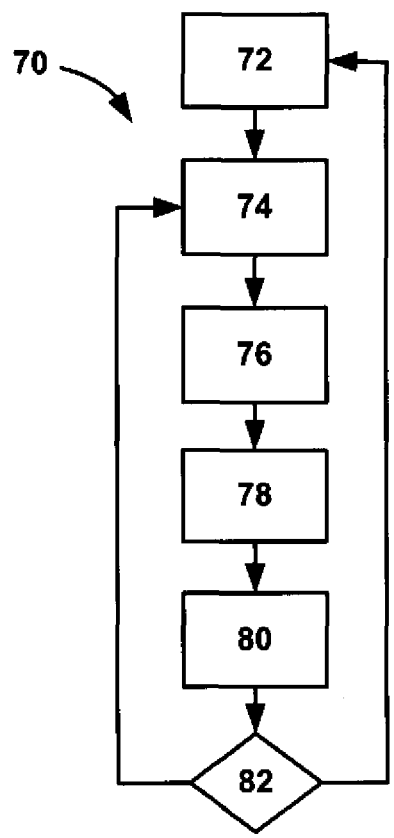
FIG. 3 is a flow chart diagram showing another process for recovering reversible stack voltage loss in a fuel cell stack.

FIG. 3 is a flow chart diagram 70 showing a process for removing contaminants from the fuel cell stack 12 to recover voltage loss while the vehicle 46 is being serviced and not while the vehicle is being normally operated. A service technician first connects a service tool, such as a controller, to the vehicle 46 to initiate and perform the voltage recovery operation at box 72. When the voltage recovery is initiated, the stack 12 is first run wet at box 74 in the same manner as discussed above. The low voltage condition is then implemented at box 76, and can be performed in the manner discussed above at the box 56. However, instead of performing this step for 10 seconds, the low voltage condition is performed for a longer period of time, for example, one minute, to allow more contaminates to be released. The flush step is then performed at box 78 as above and can also be performed for a longer period of time. The recovery process is run for the same number of events, namely five, but since the steps are performed for a longer period of time, more stack voltage is recovered, such as 30-40 mV. Loads on the vehicle, such as the radiator fan, compressor, cooling fluid pump, battery charging, etc., can be used to sink power from the stack 12 during the service recovery procedure. The service recovery would be needed to be less often, such as every two years.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for removing contaminants from electrodes in a fuel cell stack in a fuel cell system to recover stack voltage loss, said method comprising:
   causing liquid water to be present at surfaces of the electrodes in the fuel cell stack, wherein causing liquid water to be present includes reducing the temperature of the stack;
   applying a relatively low voltage potential to the fuel cell stack to cause contaminants on the electrodes to be released into the liquid water; and
   flushing the fuel cell stack by causing water flow through the stack to remove the contaminants.

2. The method according to claim 1 wherein applying a low voltage potential to the stack includes starving a cathode side of the fuel cell stack of oxygen.

3. The method according to claim 2 wherein applying a low voltage potential to the stack includes operating the stack at a cathode stoichiometry of about 1.

4. The method according to claim 1 wherein applying a low voltage potential to the fuel cell stack includes applying the low voltage potential when the fuel cell system is in a stand-by mode.

5. The method according to claim 1 wherein applying a low voltage potential includes applying the low voltage potential when the fuel cell system is shut down and flushing the fuel cell stack includes flushing the fuel cell stack when the fuel cell system is then turned back on.

6. The method according to claim 1 wherein causing liquid water to be present at surfaces of the electrodes, providing a low voltage potential to the fuel cell stack and flushing the fuel cell stack are each performed as a combined series of steps where the combined series of steps is performed a plurality of times to recover the stack voltage loss.

7. The method according to claim 6 wherein the plurality of times is five times.

8. The method according to claim 1 wherein the fuel cell system is on a vehicle, and wherein the method is performed while the vehicle is being operated the method is performed while the vehicle is being operated.

9. The method according to claim 1 wherein the fuel cell system is on a vehicle, and wherein the method is performed while the vehicle is being serviced.

10. A method for removing contaminants from electrodes in a fuel cell stack in a fuel cell system on a vehicle to recover stack voltage loss, wherein the method is performed while the vehicle is being operated, said method comprising:
    causing liquid water to be present at surfaces of the electrodes in the fuel cell stack, wherein causing liquid water to be present includes reducing the temperature of the stack;
    applying a relatively low voltage potential to the fuel cell stack to cause contaminants on the electrodes to be released into the liquid water; and
    flushing the fuel cell stack by causing water flow through the stack to remove the contaminants, wherein causing liquid water to be present at surfaces of the electrodes, providing a low voltage potential to the fuel cell stack and flushing the fuel cell stack are each performed as a combined series of steps where the combined series of steps is performed a plurality of times to recover the stack voltage loss.

11. The method according to claim 10 wherein applying a low voltage potential to the stack includes starving a cathode side of the fuel cell stack of oxygen.

12. The method according to claim 11 wherein applying a low voltage potential to the stack includes operating the stack at a cathode stoichiometry of about 1.

13. The method according to claim 10 wherein applying a low voltage potential to the fuel cell stack includes applying the low voltage potential when the fuel cell system is in a stand-by mode.

14. A method for removing contaminants from electrodes in a fuel cell stack in a fuel cell system on a vehicle to recover stack voltage loss, wherein the method is performed while the vehicle is being serviced, said method comprising:

causing liquid water to be present at surfaces of the electrodes in the fuel cell stack, wherein causing liquid water to be present includes reducing the temperature of the stack;

applying a relatively low voltage potential to the fuel cell stack to cause contaminants on the electrodes to be released into the liquid water; and flushing the fuel cell stack by causing water flow through the stack to remove the contaminants, wherein causing liquid water to be present at surfaces of the electrodes, providing a low voltage potential to the fuel cell stack and flushing the fuel cell stack are each performed as a combined series of steps where the combined series of steps is performed a plurality of times to recover the stack voltage loss.

15. The method according to claim 14 wherein applying a low voltage potential to the stack includes starving a cathode side of the fuel cell stack of oxygen.

16. The method according to claim 14 wherein applying a low voltage potential to the fuel cell stack includes applying the low voltage potential when the fuel cell system is in a stand-by mode.

17. The method according to claim 14 wherein applying a low voltage potential includes applying the low voltage potential when the fuel cell system is shut down and flushing the fuel cell stack includes flushing the fuel cell stack when the fuel cell system is then turned back on.

* * * * *